US009512646B1

(12) United States Patent
Jonas et al.

(10) Patent No.: US 9,512,646 B1
(45) Date of Patent: Dec. 6, 2016

(54) ENCLOSURE LOCKING SYSTEM

(71) Applicant: Mesquite Fabrication, Inc., Mesquite, TX (US)

(72) Inventors: Raymond E. Jonas, Rowlett, TX (US); Jay Jonas, El Paso, TX (US)

(73) Assignee: Mesquite Fabrication, Inc., Mesquite, TX (US)

( * ) Notice: Subject to any disclaimer, the term of this patent is extended or adjusted under 35 U.S.C. 154(b) by 0 days.

(21) Appl. No.: 14/928,684

(22) Filed: Oct. 30, 2015

Related U.S. Application Data

(63) Continuation of application No. 13/779,905, filed on Feb. 28, 2013, now Pat. No. 9,184,573.

(60) Provisional application No. 61/604,001, filed on Feb. 28, 2012.

(51) Int. Cl.
| | |
|---|---|
| *E05B 65/06* | (2006.01) |
| *H02G 1/00* | (2006.01) |
| *E05C 19/00* | (2006.01) |
| *E05B 65/00* | (2006.01) |
| *E05C 21/00* | (2006.01) |

(Continued)

(52) U.S. Cl.
CPC .......... *E05B 65/0089* (2013.01); *E05C 19/003* (2013.01); *E05C 21/00* (2013.01); *H02G 3/081* (2013.01); *H02G 3/14* (2013.01); *H02G 1/00* (2013.01); *Y10T 70/5106* (2015.04); *Y10T 70/5168* (2015.04); *Y10T 70/5566* (2015.04)

(58) Field of Classification Search
CPC ............ H02B 1/28; H02B 1/30; H02B 1/38; H02B 1/40; H02G 1/00; H02G 3/081; H02G 3/14; H02G 21/00; E05B 65/0888; E05B 65/0089; A47B 81/00; A47B 95/008; A47B 96/067; E05C 19/003; E05C 19/005; E05C 19/18; E05C 19/184; E05C 19/186; E05C 19/188; Y10T 70/5544; Y10T 70/5168; Y10T 70/5199; Y10T 70/5566; Y10T 70/5097; Y10T 70/5093; Y10T 70/5102; Y10T 70/5106
USPC ............ 70/32, 54–56, 94, DIG. 64, DIG. 65, 70/DIG. 66, 93, 101, 135, DIG. 12, 164, 70/77–80, DIG. 56, 18; 292/256.6, 292/DIG. 21, 205, 259 R, 262, 338, 339, 292/258, 288, 289; 312/100, 245
See application file for complete search history.

(56) References Cited

U.S. PATENT DOCUMENTS

| 30,350 | A | * | 10/1860 | Rehn | ..................... | E05C 19/003 |
| | | | | | | 292/259 R |
| 39,853 | A | * | 9/1863 | Webster | ................ | E05C 19/003 |
| | | | | | | 292/259 R |

(Continued)

*Primary Examiner* — Lloyd Gall
(74) *Attorney, Agent, or Firm* — Grady K. Bergen; Griggs Bergen LLP

(57) ABSTRACT

A cabinet enclosure and locking system for a cabinet enclosure having an opening with a door or access panel utilizes a side mounting bracket that has a forward portion that projects from the enclosure and has an elongated slot. A locking strap member has opposite outer and inner ends, with the outer end being passing through the elongated slot and being angled at the outer end so that the locking strap member must be rotated during passage of the outer end through the elongated slot during insertion into the elongated slot. A staple assembly is used for receiving a shackle or lock pin of a pad lock and also for coupling to the locking strap member and locking the locking system in a locked condition.

20 Claims, 12 Drawing Sheets

(51) Int. Cl.
*H02G 3/08* (2006.01)
*H02G 3/14* (2006.01)

(56) References Cited

U.S. PATENT DOCUMENTS

| | | | | |
|---|---|---|---|---|
| 41,657 | A | * | 2/1864 | Webster ............... G06Q 50/184 |
| | | | | 292/259 R |
| 242,578 | A | * | 6/1881 | Ames, Jr. ................. B65D 9/32 |
| | | | | 217/56 |
| 546,164 | A | | 9/1895 | Knight |
| 868,234 | A | | 10/1907 | Tyden |
| 971,260 | A | * | 9/1910 | Flory ...................... A47J 39/00 |
| | | | | 126/273.5 |
| 1,040,573 | A | | 10/1912 | Palmer |
| 1,363,632 | A | * | 12/1920 | Wolak ..................... A47J 36/06 |
| | | | | 220/318 |
| 1,535,818 | A | | 4/1925 | Ellis |
| 1,581,185 | A | | 4/1926 | Ellis |
| 1,615,987 | A | | 2/1927 | Loewer |
| 1,779,491 | A | | 10/1930 | Rau |
| 2,126,333 | A | | 8/1938 | Kirk |
| 2,130,216 | A | | 9/1938 | Zaninovich |
| 2,373,783 | A | | 4/1945 | Schlifer |
| 2,529,432 | A | | 11/1950 | Tenner |
| 2,817,552 | A | * | 12/1957 | Bruel ...................... B65D 45/28 |
| | | | | 220/318 |
| 3,392,555 | A | | 7/1968 | Beaver |
| 3,592,497 | A | | 7/1971 | Logan, Jr. |
| 3,652,114 | A | * | 3/1972 | Cady ...................... E05B 67/38 |
| | | | | 292/281 |
| 3,665,736 | A | | 5/1972 | Wilson |
| 3,673,828 | A | | 7/1972 | Jones |
| 3,769,821 | A | | 11/1973 | Randel |
| 3,795,123 | A | * | 3/1974 | Stiffel ..................... E05B 15/02 |
| | | | | 70/417 |
| 3,809,417 | A | | 5/1974 | Craig |
| 3,945,227 | A | * | 3/1976 | Reiland ................... B60R 11/02 |
| | | | | 70/58 |
| 3,994,520 | A | * | 11/1976 | Oger ................... E02D 29/1427 |
| | | | | 292/256.73 |
| 4,324,426 | A | * | 4/1982 | Michelson ............. E05B 67/38 |
| | | | | 292/281 |
| 4,397,499 | A | * | 8/1983 | Work ....................... B60J 7/194 |
| | | | | 292/205 |
| 4,418,551 | A | | 12/1983 | Kochackis |
| 4,556,187 | A | | 12/1985 | McLin |
| 4,562,708 | A | | 1/1986 | Gros |
| 4,574,421 | A | | 3/1986 | Froese |
| 4,671,014 | A | | 6/1987 | Lack |
| 4,852,920 | A | | 8/1989 | DeForrest, Sr. |
| 5,097,581 | A | | 3/1992 | Williams et al. |
| 5,172,574 | A | | 12/1992 | Perfetto |
| 5,209,533 | A | | 5/1993 | Menard |
| 5,257,581 | A | | 11/1993 | Welling |
| 5,267,688 | A | | 12/1993 | Benefield |
| 5,340,172 | A | | 8/1994 | Sweet |
| 5,388,876 | A | | 2/1995 | Saincome |
| 5,419,165 | A | | 5/1995 | Perkins |
| 5,987,936 | A | | 11/1999 | Hartman, Jr. |
| 6,209,574 | B1 | | 4/2001 | Prewitt |
| 6,591,641 | B1 | | 7/2003 | Cann |
| 6,619,708 | B1 | * | 9/2003 | Naylor ................... E05C 19/186 |
| | | | | 292/259 R |
| 6,735,989 | B1 | | 5/2004 | Schramm et al. |
| 6,766,671 | B2 | * | 7/2004 | Haczynski .............. E05B 67/36 |
| | | | | 70/23 |
| 6,868,702 | B1 | | 3/2005 | Alkire |
| 6,915,670 | B2 | | 7/2005 | Gogel |
| 7,044,512 | B1 | * | 5/2006 | Moreno ............... B65D 90/008 |
| | | | | 292/259 R |
| 7,681,421 | B2 | | 3/2010 | Cannon |
| 8,276,411 | B2 | * | 10/2012 | Thomas, II ........... E05C 19/003 |
| | | | | 70/14 |
| 9,027,280 | B2 | * | 5/2015 | Huddleston ............. E05C 21/00 |
| | | | | 49/62 |
| 9,184,573 | B1 | * | 11/2015 | Jonas ....................... H02G 1/00 |
| 9,243,431 | B1 | * | 1/2016 | DeLeon ................. E05C 19/003 |
| 9,284,751 | B2 | * | 3/2016 | Rickman ............. E05B 65/0089 |
| 9,284,760 | B2 | * | 3/2016 | Canaday ............... E05C 19/003 |
| 2002/0178766 | A1 | | 12/2002 | Jackson et al. |
| 2004/0107744 | A1 | | 6/2004 | Chen |
| 2005/0252257 | A1 | | 11/2005 | Woods et al. |
| 2006/0156768 | A1 | | 7/2006 | Wilson et al. |
| 2007/0205703 | A1 | | 9/2007 | McLuckie et al. |
| 2009/0217713 | A1 | | 9/2009 | Loughlin et al. |
| 2010/0037664 | A1 | | 2/2010 | Pitisethakarn |
| 2010/0180646 | A1 | | 7/2010 | Mazingo |
| 2012/0240642 | A1 | | 9/2012 | Senn |
| 2013/0219828 | A1 | | 8/2013 | Canaday |
| 2014/0338263 | A1 | * | 11/2014 | Huddleston ............. E05C 21/00 |
| | | | | 49/62 |

* cited by examiner

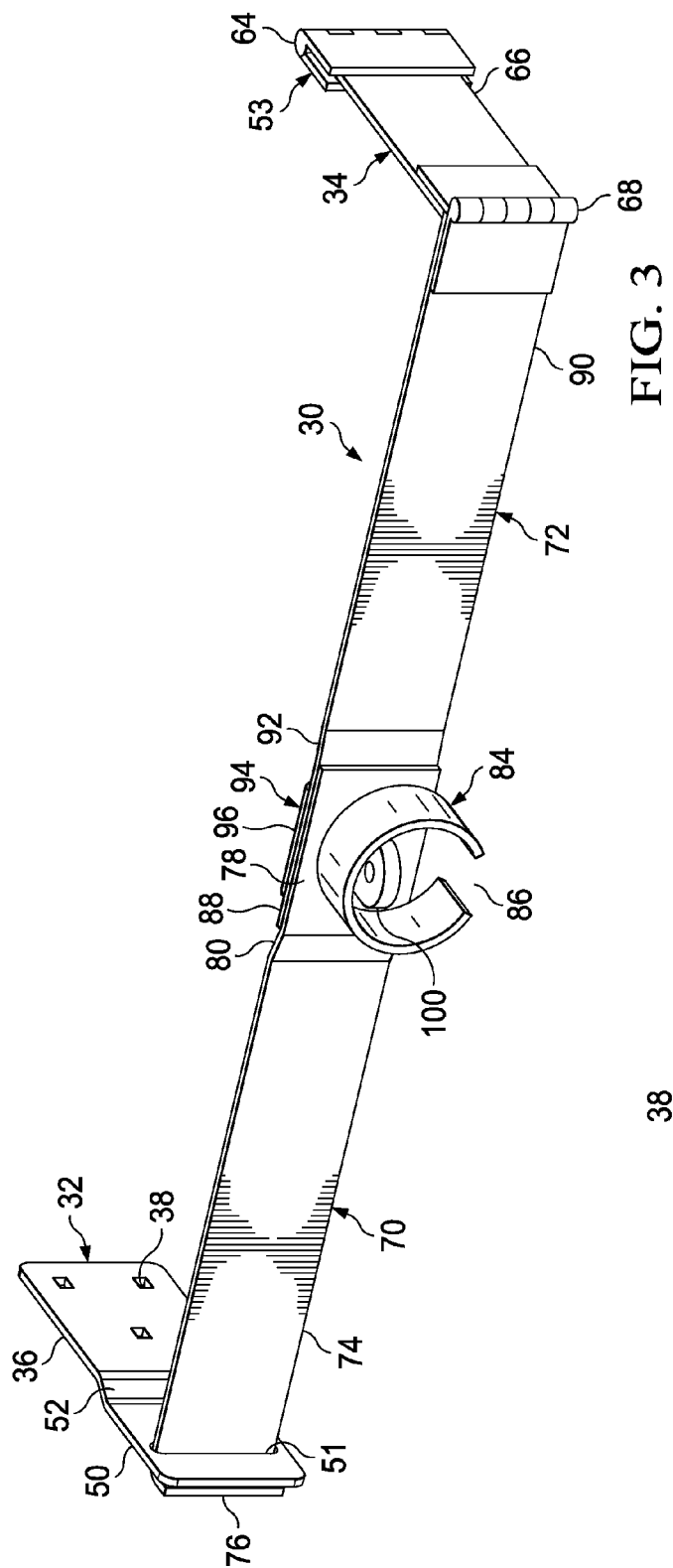
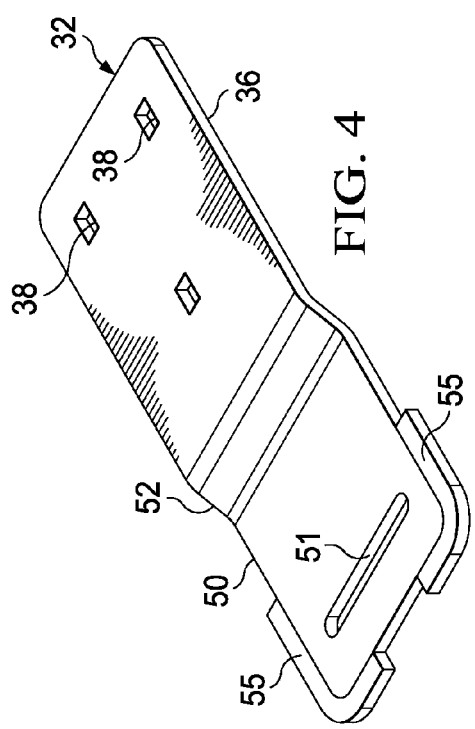

ENCLOSURE LOCKING SYSTEM

CROSS-REFERENCE TO RELATED APPLICATIONS

The present application is a continuation of U.S. patent application Ser. No. 13/779,905, filed Feb. 28, 2013, now U.S. Pat. No. 9,184,573, which claims the benefit of U.S. Provisional Application No. 61/604,001, filed Feb. 28, 2012, each of which is incorporated herein by reference in its entirety for all purposes.

BACKGROUND

Enclosures used to house electrical equipment and instrumentation are generally configured as a box or cabinet. Such enclosures may be of the type used to house radio or telecommunications equipment and instrumentation, such as may be found or be associated without outdoor antennas, cell towers, transmission equipment, etc. Often such enclosures may house valuable materials or items, such as electrical components, copper wiring or batteries. Because such enclosures are often found outdoors in isolated areas, they can be vulnerable to tampering and theft of the contents contained within the enclosure. Oftentimes, the enclosure is provided with a non-substantial latch mechanism that is padlocked with a conventional padlock having an exposed shackle shank. The padlock and/or latch mechanism can often be quickly and easily removed with a common bolt cutter or hacksaw. Accordingly, the present invention serves to overcome these shortcomings.

BRIEF DESCRIPTION OF THE DRAWINGS

For a more complete understanding of the present invention, and the advantages thereof, reference is now made to the following descriptions taken in conjunction with the accompanying figures, in which:

FIG. 3 is a front perspective view of a locking system for use with an enclosure, such as that of FIG. 1, and constructed in accordance with the invention;

FIG. 4 is a perspective view of a side mounting bracket of the locking system of FIG. 3;

DETAILED DESCRIPTION

Figure 1:
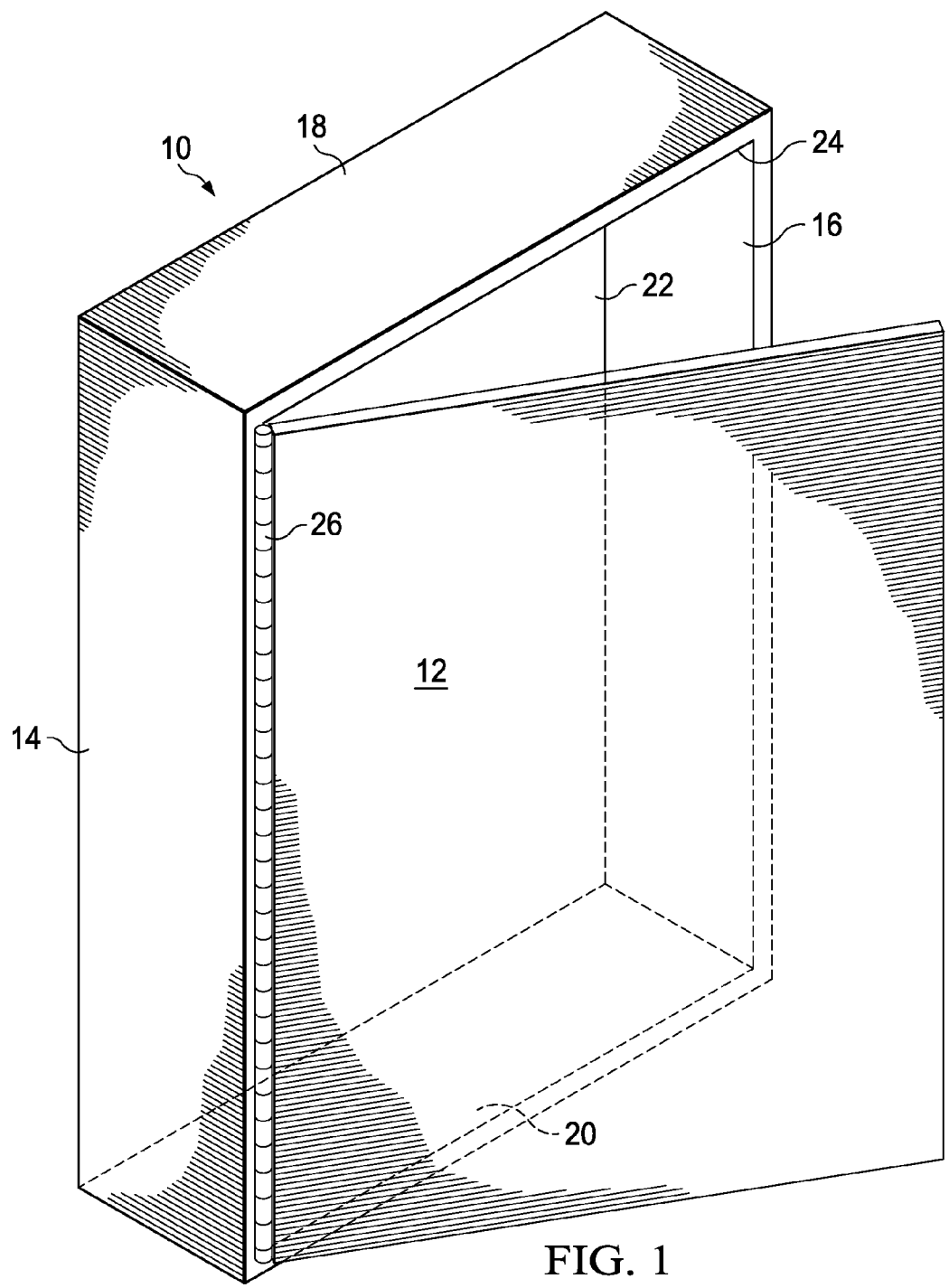
FIG. 1 is a front perspective view of an enclosure that may be locked with the locking systems of the invention.

Referring to FIG. 1, an enclosure 10 of the type used to house electrical equipment and systems and components thereof is shown. The enclosure 10 is representative of other enclosures, such as those discussed in the background section, as will be readily understood by those skilled in the art. Such enclosure may be a weatherproof, outdoor enclosure (e.g., Hoffman box), such as used for housing telecommunications equipment, a cabinet for a backup battery for cellular site applications, or a power protection cabinet provided with a power generator plug. The enclosure 10 and components thereof may be formed from various materials. These are typically metal materials, such as steel (e.g., 14 or 16 gauge), stainless steel, aluminum, etc., but could also be durable and strong non-metallic materials, such as fiberglass, polyester, polycarbonate, ABS, etc. In certain embodiments, the enclosure 10 may be configured or be provided with a Faraday cage or shield to block out external electrical fields.

The enclosure 10 may be configured as a rectangular box or cabinet having a forward face panel or wall 12 that extends between spaced apart opposite left and right sidewalls or panels 14, 16 that are joined together by spaced apart upper and lower walls or panels 18, 20 that each extend rearwardly from the forward panel 12 to a rear panel or back wall 22 to thus define an interior of the enclosure 10. It should be noted that expressions of orientation, such as "left," "right," "forward," "rear," "upper," "lower," "outward," "inward," etc., with respect to the various components of the enclosure 10 and locking system described herein are merely used for convenience and are not necessarily to be used in a limiting sense. Such expressions, however, have been used in a consistent manner with respect to the figures and embodiments shown and should therefore facilitate a better understanding of the invention. The upper wall 18 forms a top of the enclosure and the lower wall 20 forms a bottom or floor. While the enclosure 10 is shown as having a rectangular box configuration and the various walls or panels of the enclosure are shown as being substantially flat planar members, other configurations may be used for the enclosure and the various walls or panels may have curved or non-planar configurations. It will be appreciated by those skilled in the art that the locking system, as is described herein, would be configured accordingly to cooperate with such enclosures.

The forward face panel 12 is movable relative to the rest of the enclosure and forms a door of the enclosure 10. In the embodiment shown, the panel 12 is pivotally coupled to the enclosure by a hinge 26 locate along the left side edge to the forward panel 12. This allows the panel 12 to be pivoted or moved about the hinge 26 between open and closed positions to selectively open or close a forward opening 24 of the enclosure 10 to thus allow or prevent access to the enclosure interior. In FIG. 1, the door 12 is shown in a partially opened position. The hinge 26 may be located at other positions as well, such as the right, top or bottom edge of the panel 12. In other embodiments, the forward panel or door 12 may be movable in other manners relative to the rest of the enclosure 10. For example, the front panel 12 may be secured over the opening 24 by the use of releasable fasteners (e.g. screws, clips, etc.) so that the entire front panel 12 is removed from the enclosure 10 to access the opening 24 and interior of the enclosure 10.

Figure 2:
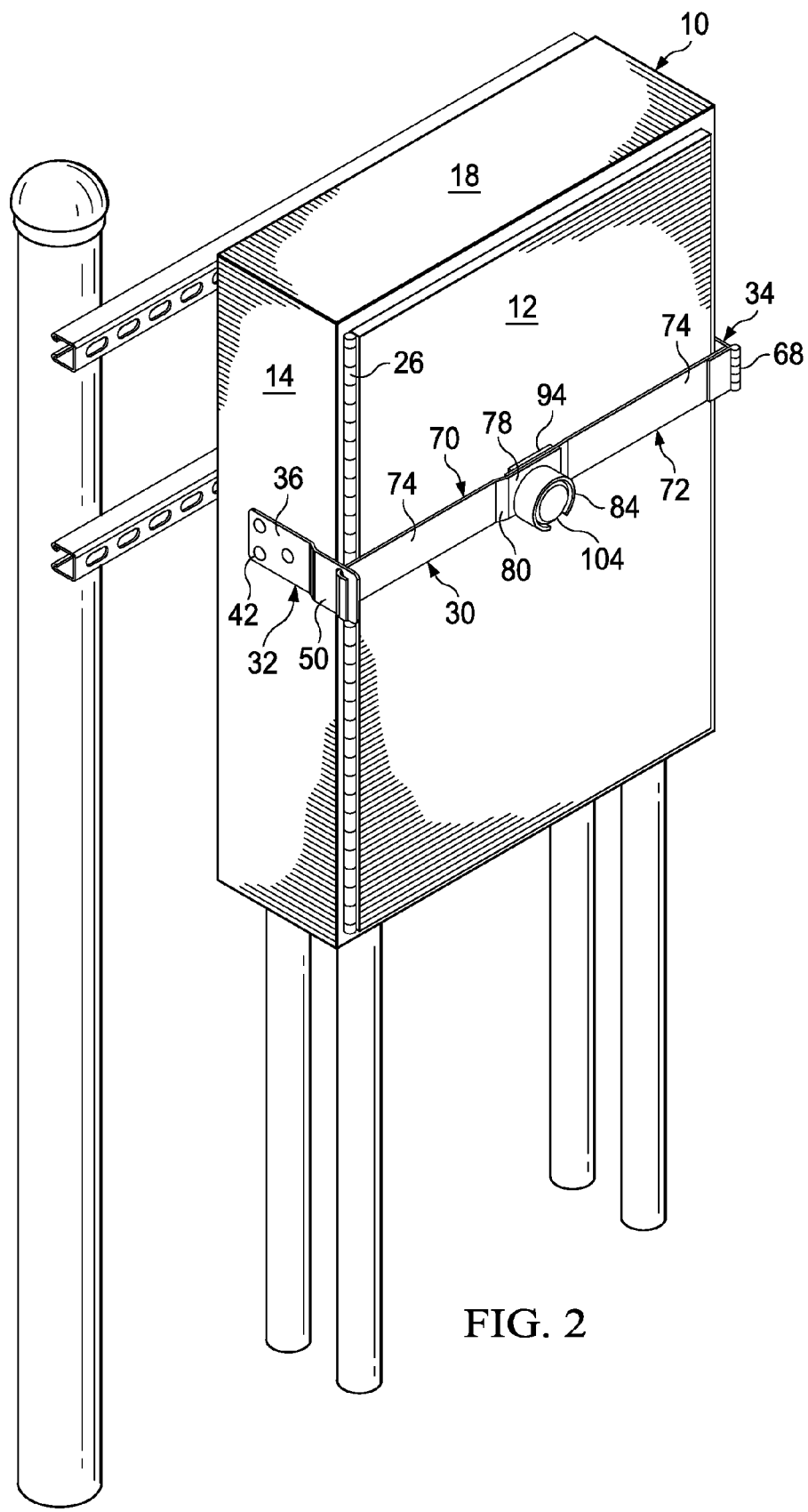
FIG. 2 is a front perspective view of an enclosure employing a locking system constructed in accordance with the invention.

Referring to FIG. 2, an enclosure locking system 30 is shown employed with the enclosure 10. The locking system 30 can be more clearly seen in FIG. 3. The locking system 30 includes a left side mounting bracket 32 and a right side mounting bracket 34 that are mounted to the exterior of the left and right sidewalls 14, 16 of the enclosure. As will be appreciated, the mounting brackets 32, 34 could also be used on any spaced apart opposite walls, such as the upper and lower walls 18, 20, located on opposite sides of a door or wall that is to be secured by the locking system 30.

Figure 5:
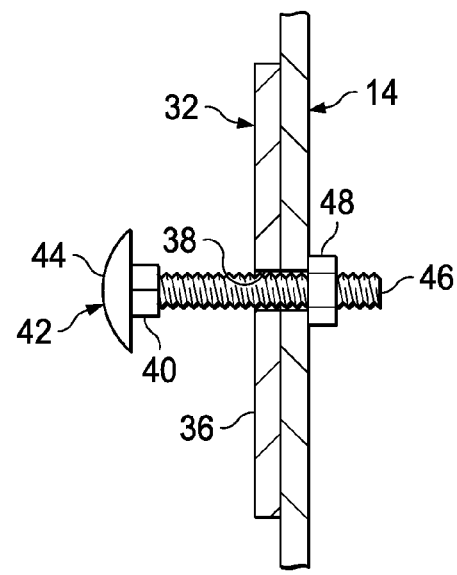
FIG. 5 is a cross-sectional view of the mounting bracket of FIG. 4, shown mounted to a sidewall of the enclosure of FIG. 1.

Referring to FIG. 4, the mounting bracket 32 is formed as an elongated plate having a rearward portion 36 that abuts against the exterior surface of the sidewall 14. One or more apertures or bolt holes 38 are provided in the rearward portion 36 to facilitate securing the bracket to the sidewall 14. The bolt holes 38 are rectangular, square or otherwise configured to receive and engage the shoulder portion 40, which is shown as being squared, of a carriage bolt 42 (FIG. 5) to prevent rotation of the shoulder portion 40 within the bolt hole 38. The carriage bolt 42 has a rounded or domed head 44 that is configured so that it is non-engagable or cannot be engaged or rotatably driven with a tool, such as a screwdriver or wrench, from the exterior of the enclosure 10. The threaded shank 46 of the bolt 42 engages a threaded nut 48 that is only accessible from the interior of the enclosure 10 and is positioned on the interior side of the sidewall 14 to tighten and secure the bracket 32 in place.

Other releasable fasteners that are inaccessible and/or non-engagable with a cooperating tool from the exterior of the enclosure may also be used to secure the mounting bracket 32 to the sidewall 14. In other embodiments, the mounting bracket 32 may be non-releasably coupled to the sidewall 14, such as through welding, or otherwise incorporating the mounting bracket 32 into or to the structure of the sidewall 14 so that it is non-removable from the exterior of the enclosure 10.

The forward portion 50 (FIG. 4) of the bracket 32 is shown flared or stepped outward from the rearward portion 36 and sidewall 14. An intermediate, transitional flared portion or step 52 joins the rearward and forward portions 36, 50 together. This facilitates accommodation of framework or other projecting structures that may be located at the front of the enclosure 10, such as the hinge 26. In other embodiments the bracket 32 may be a flat planar member, with the rearward portion 36 and forward portion 50 both lying in the same plane.

The forward portion 50 of the bracket 32 projects forward beyond the forward end of sidewall 14 a distance. On this forward projecting portion near the forward end of the forward portion 50 of the mounting bracket 32, an elongated, vertical strap member slot 51 is provided for receiving a strap member, as is described later on.

In certain embodiments, as shown in FIG. 4, additional reinforcement areas, such as the areas 55, may be provided on the forward portion 50 of bracket 32 surrounding the slot 51. The areas 55 are shown as strips of material that are welded or otherwise secured to the forward edges and corners of the forward portion 50 surrounding the slot 51. The areas 55 may be formed from a different material (e.g., hardened tool steel, etc.), than the material of the bracket 32 that is more difficult to cut or otherwise damage so that slot 51 cannot be opened, such as by cutting, or damaged. The reinforcement areas 55 may be welded or otherwise non-removably secured to the bracket 32. Such reinforcement areas, such as the areas 55, may be provided on other members or areas described herein in areas of the various members of the locking system that may be prone to tampering, as well.

Figure 6:
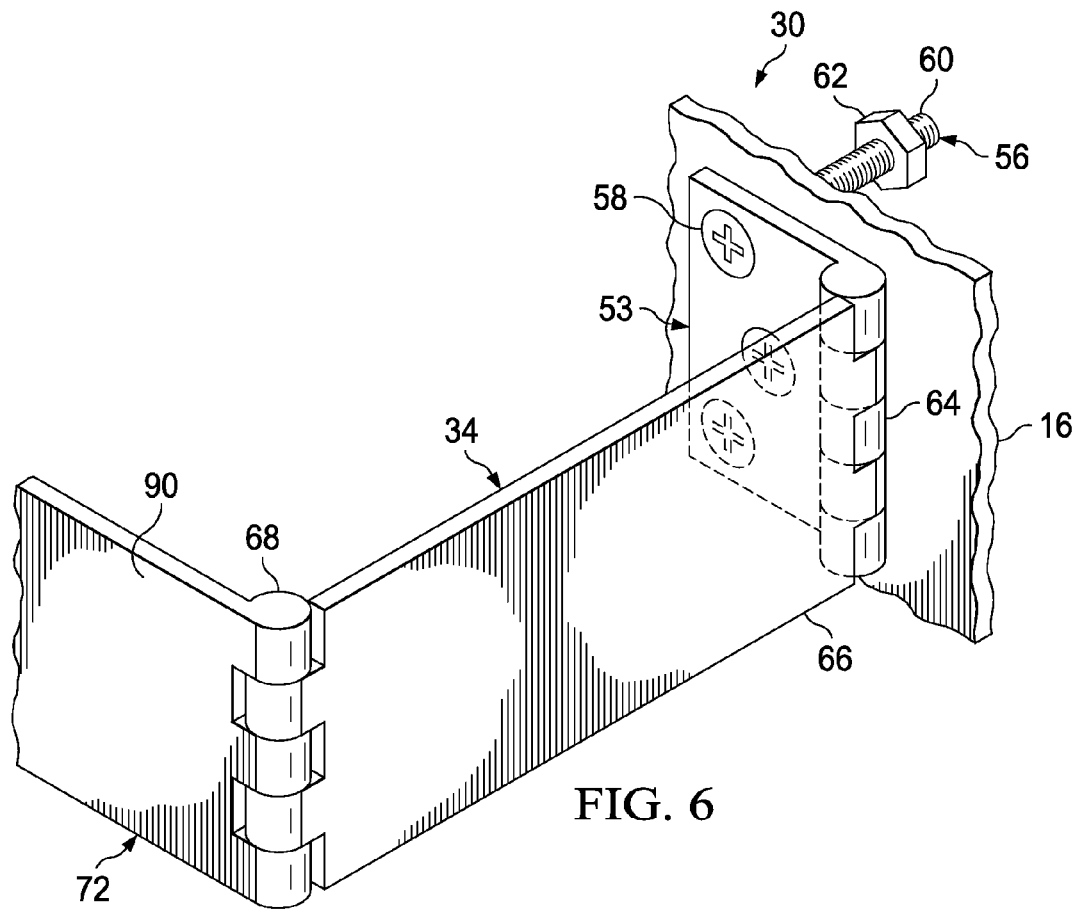
FIG. 6 is a perspective view of a doubled-hinged, side mounting bracket shown mounted to an opposite sidewall of the enclosure of FIG. 1, and pivotally coupled to a outward end of a strap member of the locking system of FIG. 3.
Figure 7:
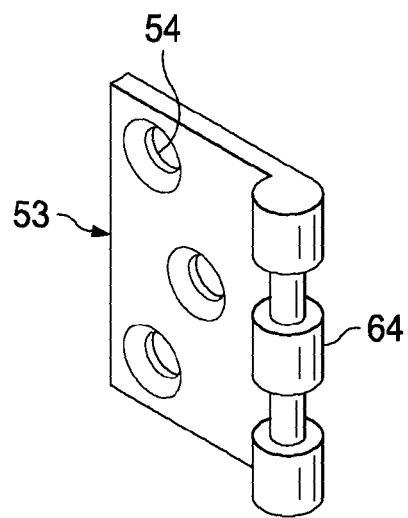
FIG. 7 is a perspective view of a sidewall abutting portion of the mounting bracket of FIG. 6.

The right mounting bracket 34 is shown more fully in FIG. 6. The mounting bracket 34 has a rear abutting portion 53 that is mounted to and abuts against the exterior surface of the right sidewall 16. FIG. 7 shows a more detailed view of the abutting portion 53. The abutting portion 53 is generally formed as a substantially flat plate or planar member having one or more bolt holes or apertures 54 for receiving a screw, bolt or other fastener 56 (FIG. 6). In the embodiment shown in FIG. 7, the bolt holes 54 are configured as countersink holes for receiving a cooperating countersink head 58 of the bolt 56 to facilitate a flush configuration for the exterior of the abutting portion 53. The head 58 may be configured with a slot or engaging structure to engage a screwdriver or other tool (not shown). As will become apparent, the bolt heads 58 become inaccessible when the enclosure locking system 30 is in a locked condition. The threaded shank 60 of the bolt 56 extends into the enclosure interior and engages a nut 62 that is only accessible from the interior of the enclosure 10 and is positioned on the interior side of the sidewall 16 to tighten and secure the bracket 34 in place.

The rearward end of the abutting portion 53 of the mounting bracket 34 is formed as or is otherwise coupled to a rearward hinge 64 that is coupled or cooperates with the rearward end of a hinge portion 66 of the mounting bracket 34. The hinge portion 66 is also formed as a substantially flat plate or planar member having a forward end that projects forward beyond the forward end of the right sidewall 16 when the hinge portion 66 is pivoted against the abutting portion 53, so that it generally abuts or is in close proximity to the abutting portion 53. When in this position, which also corresponds to the locked condition of the locking system 10, the bolt heads 58 of the bolts 56 are covered by the hinge portion 66 and are inaccessible so that the mounting bracket 34 cannot be unfastened and removed from the exterior of the enclosure 10.

Other releasable coupling mechanisms that are inaccessible and/or non-engagable with a cooperating tool from the exterior of the enclosure 10 may also be used to secure the mounting bracket 34 to the sidewall 16. In other embodiments, the abutting portion 53 of the mounting bracket 34 may be non-releasably coupled to the sidewall 16, such as through welding, or the mounting bracket 34 may be otherwise non-releasably incorporated into or coupled to the structure of the sidewall 16.

The forward end of the hinge portion 66 of the bracket 34 is also configured as or is coupled to a forward hinge 68. The hinges 64, 68 should be configured so that uncoupling or disassembly of the hinges 64, 66 is prevented when the locking system 10 is in the locked condition.

It should be noted that, while the mounting brackets 32, 34 are shown in particular configurations and being mounted to the sidewalls 14, 16, they may have other configurations and be mounted to the enclosure 10 in other manners as well. For example, the mounting brackets 32, 34 may be formed as non-planar members or members with non-planar portions. Additionally, the side mounting brackets 32, 34 may be formed as or from one or more contiguous or non-contiguous, integral or non-integral components that extend around the rear of the enclosure 10 (i.e., around the back wall 22) or over the top or bottom of the enclosure 10 (i.e., around the upper or lower walls 18, 20).

Figure 8:
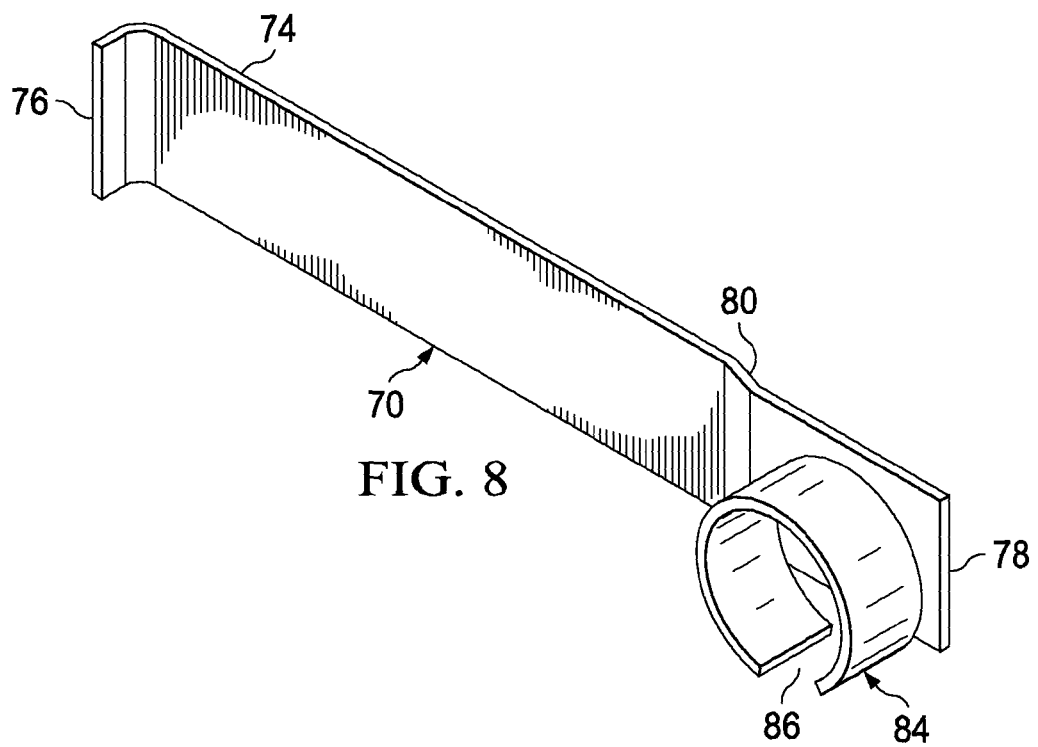
FIG. 8 is another strap member of the locking system of FIG. 3 that couples to the mounting bracket of FIG. 4.

Referring to FIG. 3, the locking system 30 further includes left and right strap members 70, 72, respectively. FIG. 8 shows a more detailed view of the left strap member 70. The strap member 70 is generally formed as an elongated plate or planar member that has an outer end or portion 74 that hooks or is bent or angled forward (L-shape) at the outermost point to form angled portion 76. The outer end 74 and angled portion 76 are configured and sized to be received within and pass through the vertical slot 51 of the left bracket 32 by angling or crooking the angled portion 76 through the slot 51 and then rotating the strap member 70 into a locked position. With the angled portion 76 being crooked and passed through the slot 51, the strap member 70 may then be moved longitudinally to various positions along its length within the slot 51. The angled portion 76 is configured and sized so that it cannot pass through the slot 51 when the length of the strap member 70 is moved longitudinally along its length within the slot 51.

An opposite inner end or portion 78 of the strap member 70 is shown flared or stepped forward from the outer portion 74. An intermediate, transitional flared or stepped portion 80 joins the opposite outer and inner end portions 74, 78 together.

Figure 9:
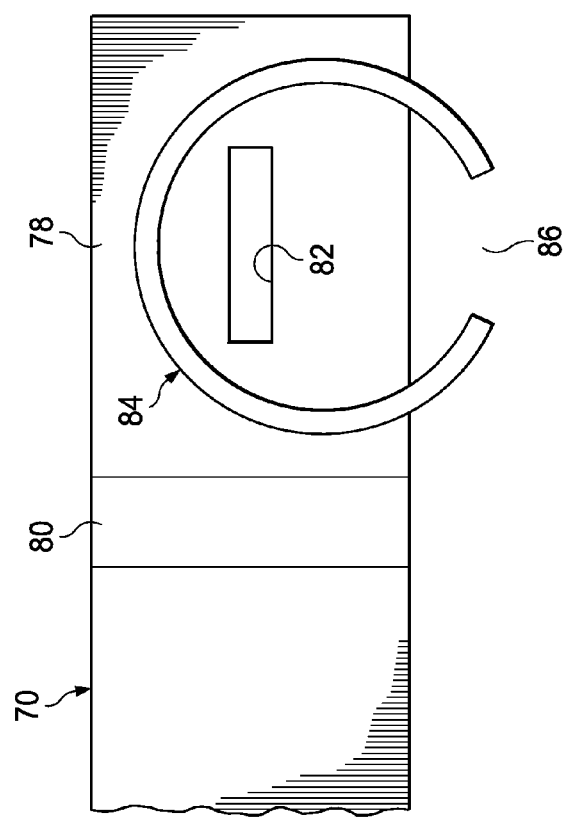
FIG. 9 is a front perspective view of an inner end of the strap member of FIG. 8.

Referring to FIG. 9, the inner portion 78 of the strap member 70 is provided with an elongated slot 82 that is formed through the thickness of the inner portion 78. A lock shroud or guard 84 is also provided on the forward face of the inner portion 78 and extends forward a distance. The lock shroud 84 is shown as being generally circular in shape and is provided with a lower open portion 86. The lock shroud 84 is non-releasably coupled to the inner portion 78, such as through welding or other non-releasable coupling mechanisms. The lock shroud 84 is configured to surround a padlock used for locking the locking system 30 to facilitate prevention of tampering with such padlock or accessing a shackle or lock pin of the padlock. In the embodiment shown, the circular shape of the shroud 84 facilitates receiving and surrounding a disk or puck lock, as is described further on. The shroud 84 may be similarly configured and constructed to that shown and described in U.S. Pat. No. 5,172,574, which is herein incorporated by reference in its entirety for all purposes.

Figure 10:
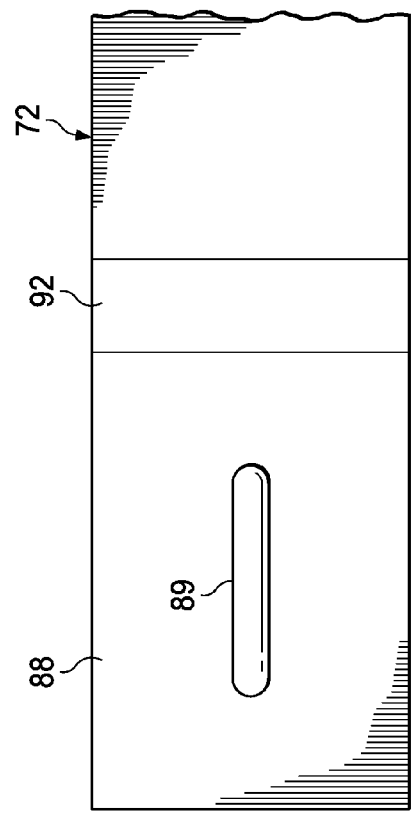
FIG. 10 is a front perspective view of an inner end of the strap member coupled to the mounting bracket of FIG. 6.

Referring to FIG. 10, the right strap member 72 is generally formed as an elongated plate or planar member that has an planar inner portion or end 88 that is also provided with an elongated slot 89 that is formed through the thickness of the inner portion 88. The inner end or portion 88 of the strap member 72 is shown flared or stepped forward from the planar outer portion or end 90. An intermediate, transitional flared or stepped portion 92 joins the opposite inner and outer end portions 88, 90 together.

The outermost end of the end portion 90 is configured as part of or is coupled to the forward hinge 68 of mounting bracket 34 so that the strap member 72 is coupled to the mounting bracket 34 through the hinge 68 to allow the strap member 72 to be pivotally moved relative to the hinge portion 66.

Figure 11:
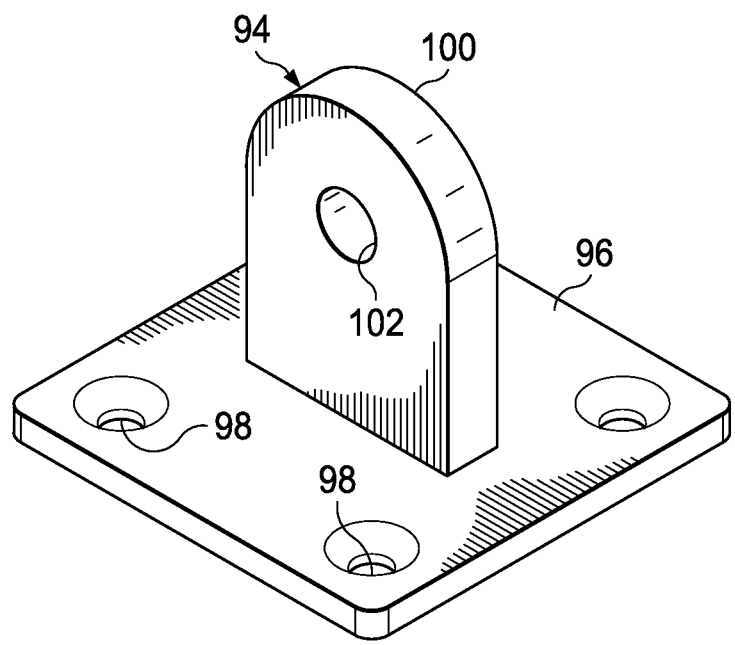
FIG. 11 is a perspective view of a staple assembly of the locking system of FIG. 3.

A staple assembly 94 of the locking system 30 is shown in FIG. 11. The staple assembly 94 includes a base or plate member 96 having one or more apertures or bolt holes 98 for receiving, screws, bolts or other fasteners. In the embodiment shown, the holes 98 are countersink holes for receiving a cooperating countersink head of a bolt or screw (not shown) to facilitate a flush forward exterior of the base 96.

Projecting forward from the base 96 is a staple member 100 having a shackle opening 102 for receiving a shackle or lock pin of a padlock or other locking device.

In the embodiment shown, the staple assembly 94 is mounted on the forward face of the door panel 12. Holes or apertures (not shown) may be formed in the door panel 12 to facilitate mounting and coupling of the staple assembly 94 to the door 12. Cooperating nuts or other fastening mechanisms (not shown), which may be located on the rear or interior side of the door 12, may be used to facilitate mounting of the staple assembly 94.

In other embodiments, the base 96 may be located and mounted on the interior or rearward side of the door panel 12. A slot or aperture (not shown) may be provided in the door 12 to receive the projecting staple member 100 so that the staple member 100 projects forward from the door 12. In still other embodiments, the staple assembly 94 may be non-releasably coupled to the door 12, such as through welding or the staple assembly 94 may be otherwise incorporated into or to the structure of the door panel 12.

The projecting staple member 100 is positioned on the face of the door panel 12 and configured to be received within and project through the slots 82, 89 of the strap members 70, 72, respectively, when they are in a locked configuration.

The mounting brackets, strap members, staple assembly, etc. and components thereof of the system 30 and other systems described herein may each formed from substantial metal, metal alloy or steel plate materials that are not readily cut with a conventional bolt cutters or hacksaw. Hardened steel materials, such as hardened carbon steel may be used. Steel alloys containing chromium, nickel, molybdenum, tungsten, boron, manganese, and combinations of these materials may be used. In particular applications, stainless steel having a thickness of ⅛ inch or greater (e.g. 3/16 to ¼ inch) is used. A minimum width or transverse dimension of 1½ or 2 inches to 5 inches or more may be provided for the mounting brackets, strap members, etc., so that they cannot be readily cut or damaged. Welds used to non-releasably or non-removably join the various components together may be formed by metal inert gas (MIG) or tungsten inert gas (TIG) welds or other suitable welding techniques used to weld such high strength or hardened materials together. In certain embodiments, all or a portion of the components of the locking system 30 may be reinforced. For example, the areas at the ends or around the perimeter of the slots 51, 82, 89 may be reinforced with hardened tool steel or other hardened materials that are highly resistant to cutting. These materials may be welded or otherwise coupled to the components or the components themselves may be formed from these materials.

It should be noted in the description, if a numerical value or range is presented, each numerical value should be read once as modified by the term "about" (unless already expressly so modified), and then read again as not so modified unless otherwise indicated in context. Also, in the description, it should be understood that an amount range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific points within the range, or even no point within the range, are explicitly identified or refer to, it is to be understood that the inventor appreciates and understands that any and all points within the range are to be considered to have been specified, and that inventor possesses the entire range and all points within the range.

In use, the enclosure 10 is provided with the locking system 30. This may be provided as an add-on that is provided with a preexisting enclosure or the enclosure 10 may be provided with the locking system 30 already provided and incorporated with the enclosure 10. The mounting brackets 32, 34, right strap member 72 and staple assembly 94 are coupled, mounted or otherwise secured to the enclosure 10 as previously described. The left strap member 70 may be initially removed from the locking system 30 when in an unlocked condition.

With the left strap member 70 removed, the door 12 of the enclosure 10 may be opened by pivoting the right strap member 72 out of the way. This is accomplished by the double hinges 64, 68 that allow both the hinge portion 66 of the mounting bracket 34 and the strap member 72 to be pivoted to an open position outward and fully away from the side of the door 12 and enclosure 10. The door 12 may then be opened to allow access to the interior of the enclosure 10.

When the door 12 is closed, the locking system 30 can be locked to a locked condition to prevent unauthorized access to the interior of the enclosure. To lock the locking system 30, the right strap member 72 is rotated or pivoted about the hinges 64, 68, to a closed position wherein the strap member 72 extends across and overlies the closed door panel 12, with the staple member 100 being received and projecting through the slot 89. The flared or stepped inner end 88 of the strap member 72 facilitates accommodating the thickness of the base 96 of the staple assembly 94 so that it generally abuts against the forward face of the base 96.

When the right strap member 72 is in this closed position, the hinge portion 66 of the right mounting bracket 34 will overlie and abut against the sidewall abutting portion 53 so that the fasteners 58 are effectively covered by the portion 66 and are thus inaccessible and cannot be tampered with or removed.

The left strap member 70 is then secured by initially angling or crooking the angled portion 76 and inserting it through the slot 51 of the left mounting bracket 32. Once the angled portion 76 is passed through the slot 51, the strap member 70 can then be rotated towards the front of the panel 12 so that it extends over and overlies the panel 12. The slot 51 allows the strap member 70 to be moved longitudinally along its length inward or outward to a closed position wherein the inner end 78 is positioned and aligned so that it overlaps the inner end 88 of the right strap member a distance and so that the slot 82 is aligned and receives the projecting staple member 100 of the staple assembly 94. With the staple member 100 received within the slot 82, the inner end 78 of the left strap member 70 extends across and overlies the door panel 12. The forwardly flared or stepped inner end 78 of the left strap member 70 facilitates accommodating the thicknesses of both the inner end 88 of the right strap member 72 and the base 96 of the staple assembly 94. The hooked or angled outer end 76 prevents removal of the left strap member 70 from the mounting bracket 32 when the strap member 70 generally lies or abuts against the door panel 12 and the staple member 100 is received within the slot 82 of the inner end 78.

With the locking system 30 in the above described locking configuration, a padlock or other locking device, such as the padlock 104 of FIG. 2, may then be used to lock the locking system 30, with the shackle or locking pin (not shown) of such padlock being received within the shackle opening 102 of the staple member 100. With the padlock locked on the staple member 100, this effectively couples and locks the strap members 70, 72 together on the staple member 100 and locks the locking system 30 in a locked condition. In particular embodiments, the padlock 104 may be a disk or puck lock, which are conventional in design. Examples of such disk or puck padlocks are describe in U.S. Pat. Nos. 3,769,821; 5,172,574; and 6,766,671, each of which is incorporated herein by reference for all purposes. The shroud 84 effectively covers the body of the lock 104 to prevent tampering or access to the lock 104 and shackle or locking pin of such lock. The opening or gap 86 of the lock shroud 84 facilitates access to a portion of the lock 104 to facilitate insertion of a key or otherwise provides appropriate access to unlock the padlock 104.

In other embodiments, the left strap member 70 may be configured without the lock shroud 84 and be positioned over the door panel 12 and over the staple member 100 first, followed by the right strap member 72. In such cases, the lock shroud 84 is provided on the forward face of the inner end of the right strap member 72.

With the padlock 104 removed, the locking system 30 can be removed by reversing the process used to configure the locking system to its locked configuration, as previously described. This involves lifting the left strap member 70 from the staple member 100 and sliding the strap member 70 through the slot 51 of mounting bracket 32 so that it can then be removed from the slot 51 and mounting bracket 32 and placed out of the way. The right strap member 72 can then be lifted from the staple member 100 and rotated out of the way of the door 12, about hinges 66, 68, so that the door 12 can be opened to access the interior of the enclosure 10.

As will be apparent to those skilled in the art, although the locking system 30 was described for a particular embodiment, variations of the locking system may also be provided or the locking system 30 may be used in a different manner. For example, the positions of the left and right mounting brackets and strap members may be reversed or they may be used at upper and lower positions so that the strap members extend vertically instead of horizontally across the panel door 12. Additionally, a single mounting bracket may be employed with locking straps, or a series of locking straps that are coupled together by hinges or the like, being coupled to the single mounting bracket so that they extend around the entire perimeter of the enclosure.

Additionally, the locking system 30 may be used with enclosures of different configurations, such as with a door hinged on the left side or a non-hinged door that is merely removed from the front of the enclosure, etc. More than one locking system 30, or other locking system described herein, may be used with a particular enclosure for locking portions thereof.

Figure 12:
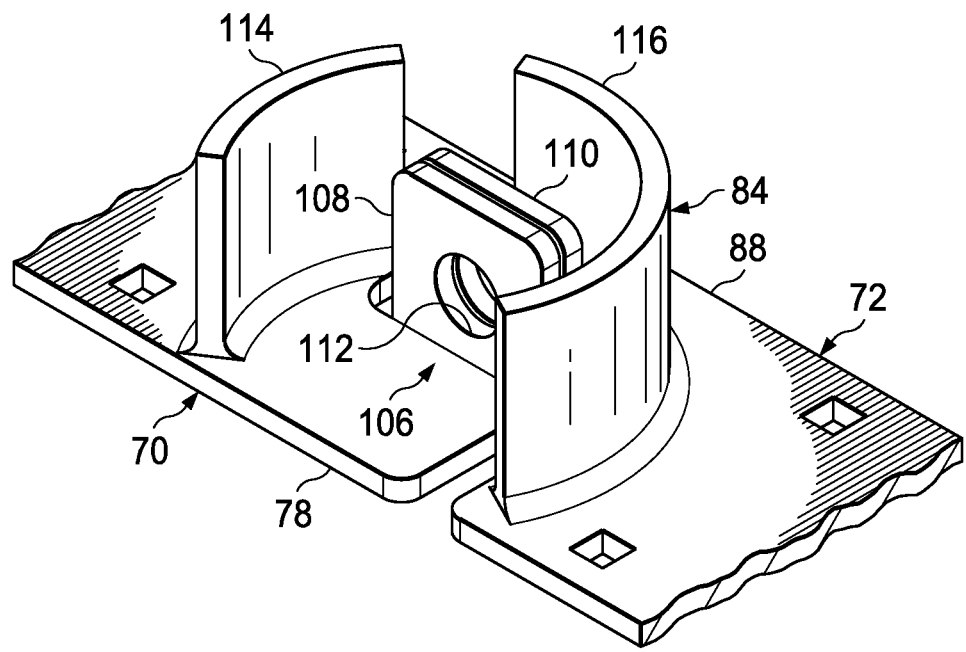
FIG. 12 is a perspective view of an alternate embodiment of the inner ends of strap members of the locking system that incorporates cooperating lock shroud portions and staple assembly.

Referring to FIG. 12, another configuration of the inner ends 78, 88 of the strap members 70, 72, respectively, is shown that eliminates the need for a separate staple assembly that is mounted to the panel door 12. In the embodiment shown, a staple assembly 106 is shown formed from two staple members 108, 110 provided on the inner ends 78, 88, respectively, which are configured in longitudinally overlapping stepped configurations—one above the other, of the strap members 70, 72. The staple members 108, 110 have shackle apertures or openings that align with one another when the strap members 78, 88 are in the closed or locked configuration.

Additionally, the locking shroud 84 is formed from separate locking shroud portions 114, 116 on the inner ends 78, 88, respectively, that cooperate when in the locked position to form the locking shroud 84.

Figure 13:
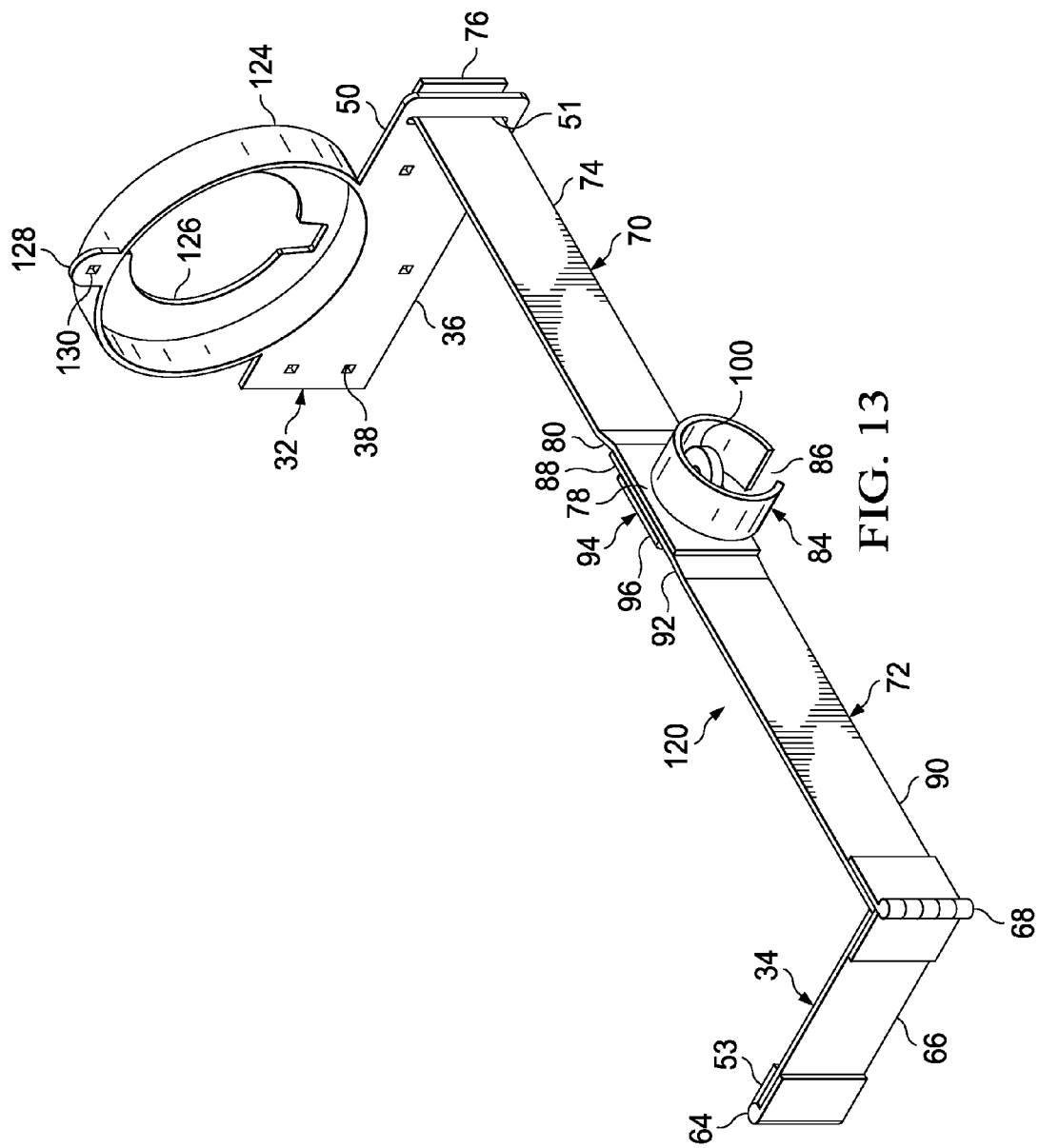
FIG. 13 is a front perspective view of an alternate embodiment of a locking system that is provided with a power plug guard.
Figure 14:
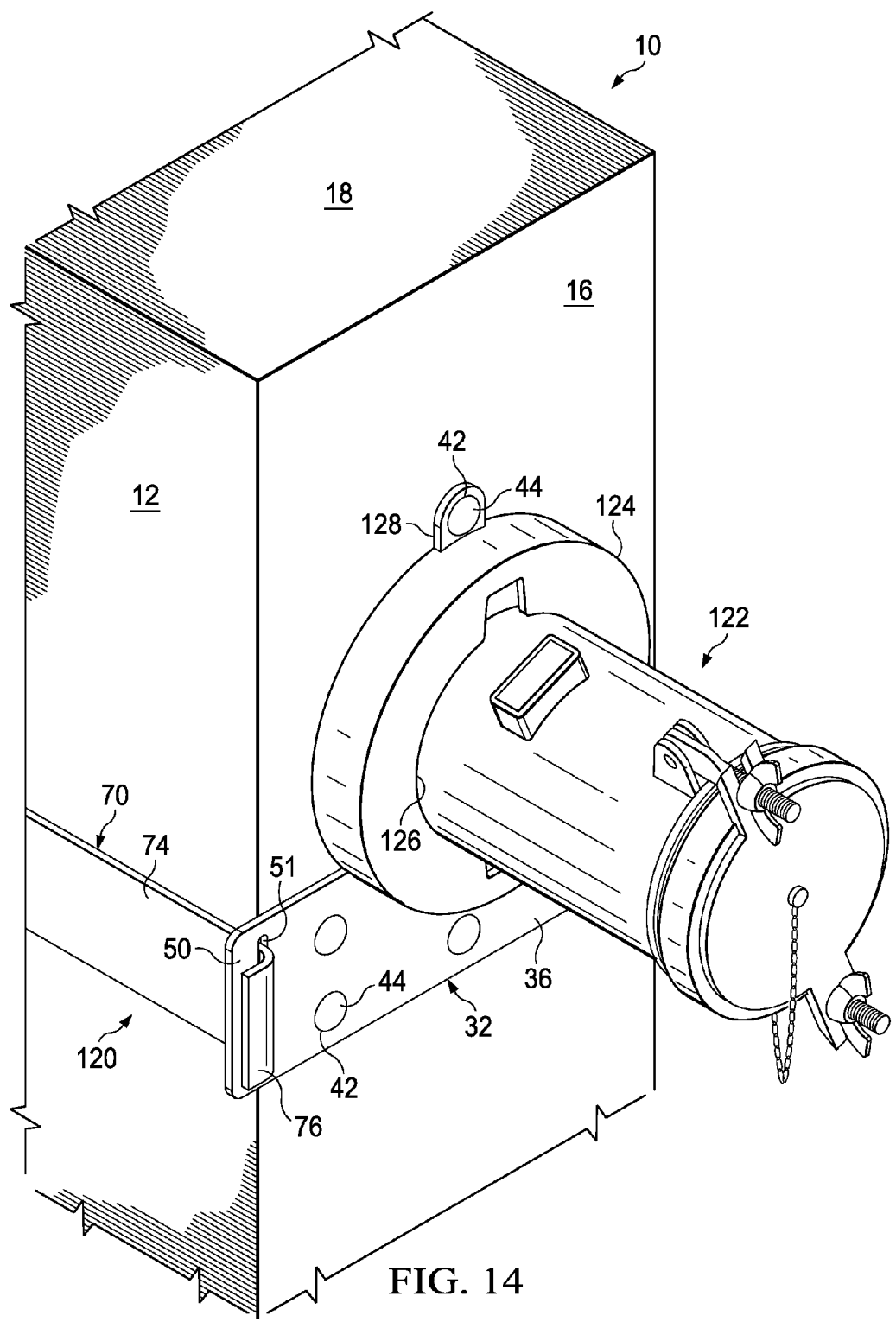
FIG. 14 is a front perspective view of the locking system of FIG. 13, shown employed with a power protection enclosure with a projecting power plug.

Referring to FIG. 13, a locking system 120 is shown that is similar to the locking system 30, with similar components designated with the same reference numerals. The locking system 120 differs in one aspect from the locking system 30 in that the positions of the mounting brackets 32, 34 and strap members 70, 72 are reversed (i.e. left/right). The locking system 120 also differs in that it is one that may be used with a power protection enclosure or cabinet that has a power generator plug 122 that projects from the side of the enclosure, as shown in FIG. 14.

Figure 15:
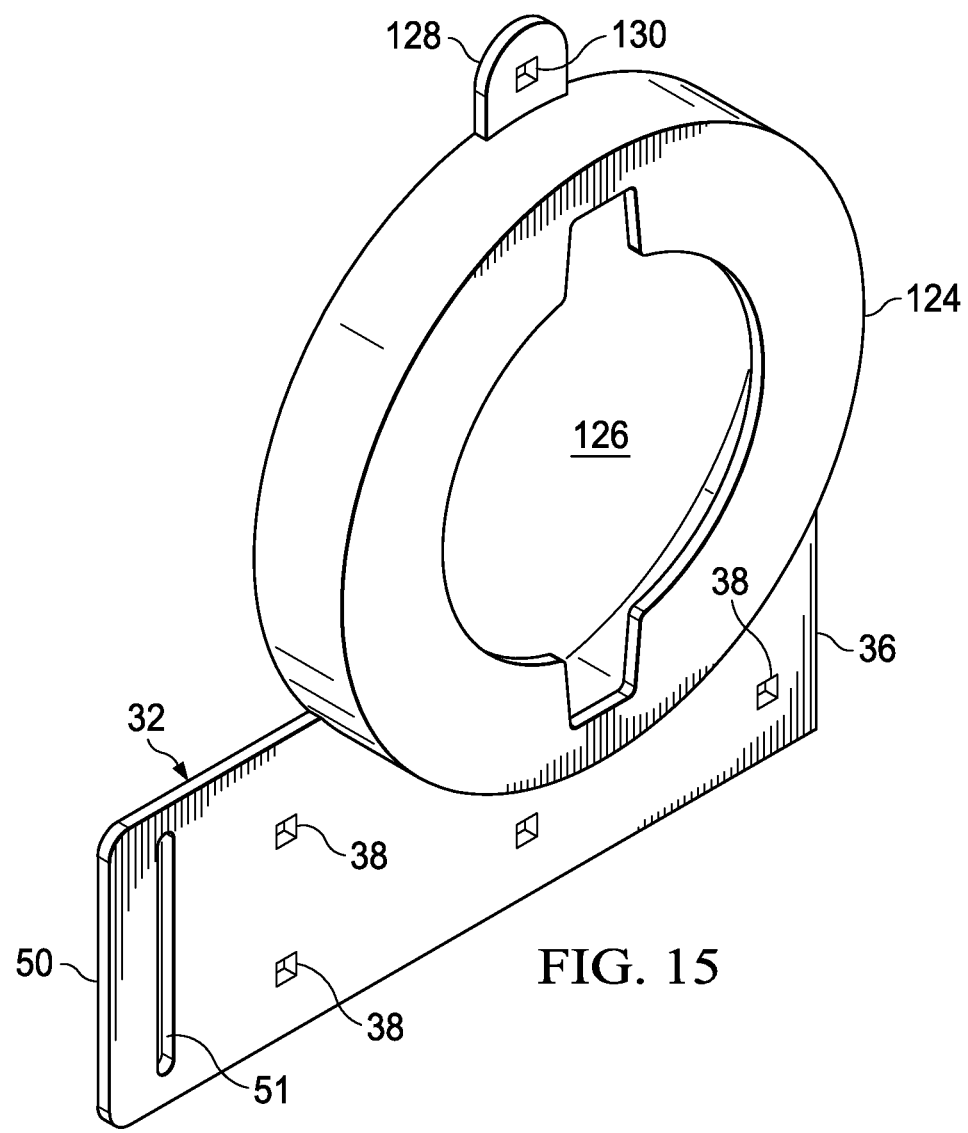
FIG. 15 is a perspective view of a mounting bracket of the locking system of FIG. 13 showing the power plug guard.

As can be seen more fully in FIG. 15, the rearward portion 36 of the mounting bracket 32 has incorporated with it a power plug guard or shroud 124 having a central opening 126 that receives and accommodates the projecting power plug 122 that projects from the enclosure 10. A mounting flange or tab 128 is also provided with the shroud 124 and has an aperture 130 that may be configured like the holes 38 of the bracket 32 for use with carriage bolts 42, as previously described.

The bracket 32 also differs from that of system 30 in that the forward portion 50 is not stepped or flared, but is coplanar with the rearward portion 36.

Figure 16:
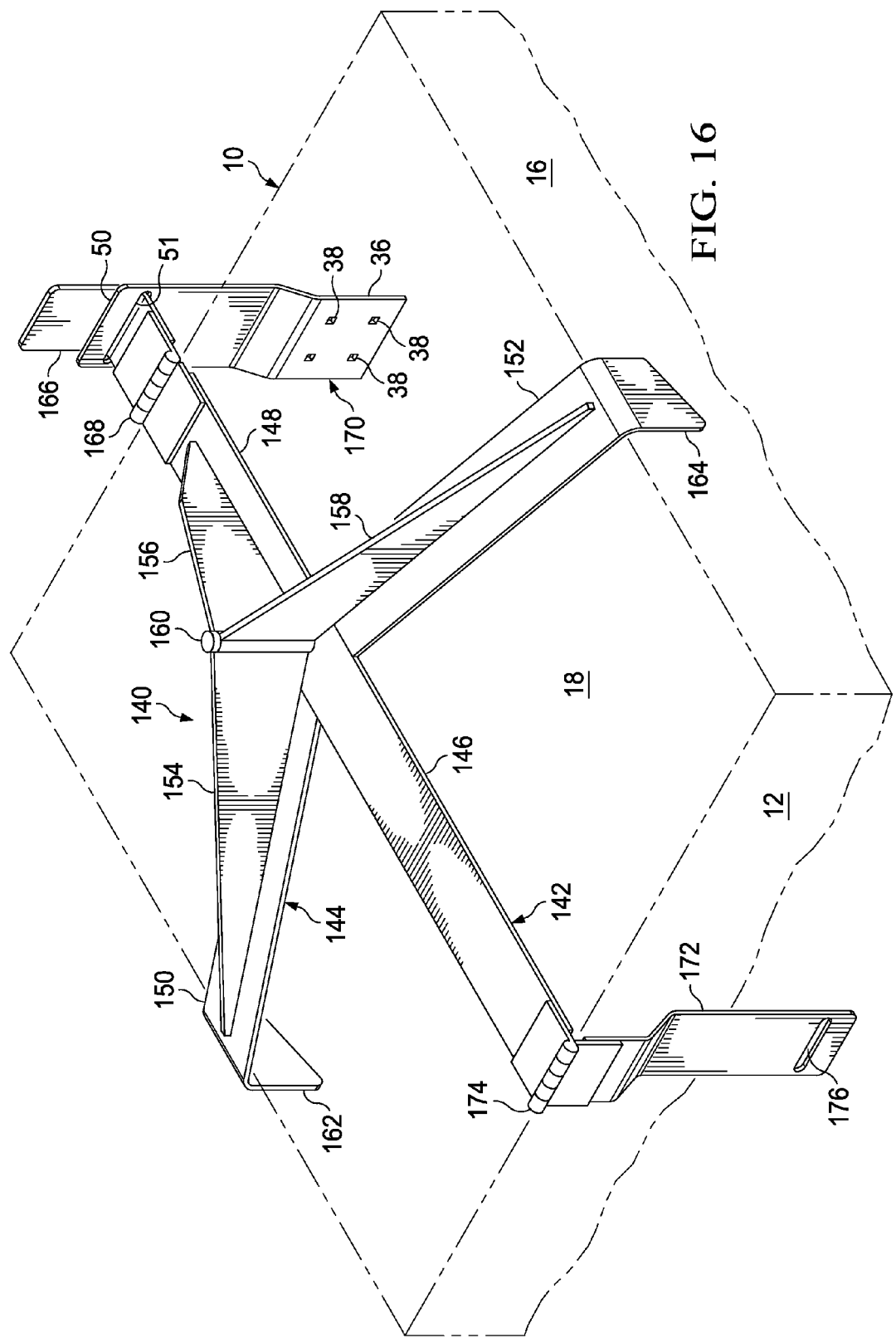
FIG. 16 is a perspective view of a cover mount that may be used with the locking systems of FIGS. 3 and 13.

Referring to FIG. 16, a cover mount assembly 140 is shown that may be used in conjunction with the locking systems 30 and 120 or may be used by itself. The cover mount 140 is used to secure the top or upper wall 18 of an enclosure, which may be removable in some embodiments of enclosures. In particular, the cover mount 140 may be used in backup battery cabinets or enclosures.

The cover mount assembly 140 includes rigid cross members 142, 144, which are oriented generally transverse to one another. The cross members 142, 144 may be in the form of substantially flat metal plates that are configured to generally overlie the upper wall 18 of an enclosure 10. The cross member 142 is sized and configured to extend over the top or upper wall 18 of the enclosure from the front to the back of the enclosure on which it is used. The cross member 142 has a front leg 146 extending forward from the cross member 144 and a rear leg 148 extending rearward from the cross member 144. Similarly, the cross member 144 is sized and configured to extend transversely across the upper wall 18 from the left to right sidewalls 14, 16. The cross member 144 has left and right legs 150, 152 that extend from the cross member 142.

The cross members 142, 144 may be non-releasably coupled together, such as through welding, etc. Reinforcing webs, ribs or gussets, such as the upright webs 154, 156, 158, may be provided along all or a portion of the length of the upper surface of the legs 146, 148, 150, 152. In the embodiment shown, the webs 154, 156, 158 have a generally triangular configuration that converge and are joined together at apex 160, where the cross members 140, 142 cross. The webs 154, 156, 158 reinforce the cross members 140, 142 so that they cannot be pried loose or otherwise be bent or damaged.

As shown in FIG. 16, the outer ends of the legs 150, 152 have downward projecting arms or portions 162, 164 that are configured to project a distance along and overlie the left and right sidewalls 14, 16 of the enclosure on which they are used.

An angled member 166 having a generally L-shaped profile or configuration is coupled to the rear end of the rear leg 148 by a hinge 168 so that it can be pivoted downward from the position shown in FIG. 16. The free end of the angled member 166 is sized and configured to be received within a slot 51 of a rear cover mounting bracket 170 that may be configured similarly to the mounting bracket 32, previously described, with similar components labeled with the same reference numerals. The mounting bracket 170 is mounted to the rear wall 22 such as with carriage bolts 42, as previously described, and functions similarly to the mounting bracket 32. The bracket 170 is positioned on the rearward wall 22 so that end of the bracket 170 projects a distance with the slot 51 being located at a position slightly above the upper wall 18.

The hinged angled member 166 allows the rear leg 148 to be more easily coupled to the mounting bracket 170. Because space behind the enclosures may be limited or the enclosures may be at an elevated height, the hinged angled portion 166 can be pivoted into place and engaged with the mounting bracket 170 without having to angle or orient the entire cover system 140 so that the rear leg 148 engages the mounting bracket 170. In other embodiments, the outer end of the rear leg 148 may be configured similarly to the outer end 90 of the strap member 72, with the angled portion 76 being rigid, as has been previously described.

A cover strap member 172 is coupled to the forward end of the front leg 146 by a hinge 174. The strap member 172 may be configured similarly to the strap member 72, previously described. The strap member 172 is pivotal downward and upward so that it can be moved out of the way of the front panel 12 of the enclosure 10. The free end of the strap member 172 is provided with a slot 176. When the cover mount 140 is positioned over the top of the enclosure, the free end of the strap member 172 is sized and configured to overlie the staple assembly 94 so that the staple member 100 is received within the slot 176.

In use, the cover mount 140 is positioned over the top of the enclosure 10 with the free end of the angled member 166 being inserted into the slot 51 of mounting bracket 170. The free end of the strap member 172 is lowered so that it extends across the upper portion of the front panel 12 and the staple member 94 is received within the slot 176, which is the position the cover mount 140 is in during a locked condition.

When used with either of the locking systems 30, 120, the strap member 72 is pivoted and positioned on the staple member 100, followed by positioning of the other strap member 70, in the manner previously described. A padlock can then be positioned on the staple member 100 and locked so that the mounting cover and locking systems 30, 120 are in a locked condition.

Figure 17:
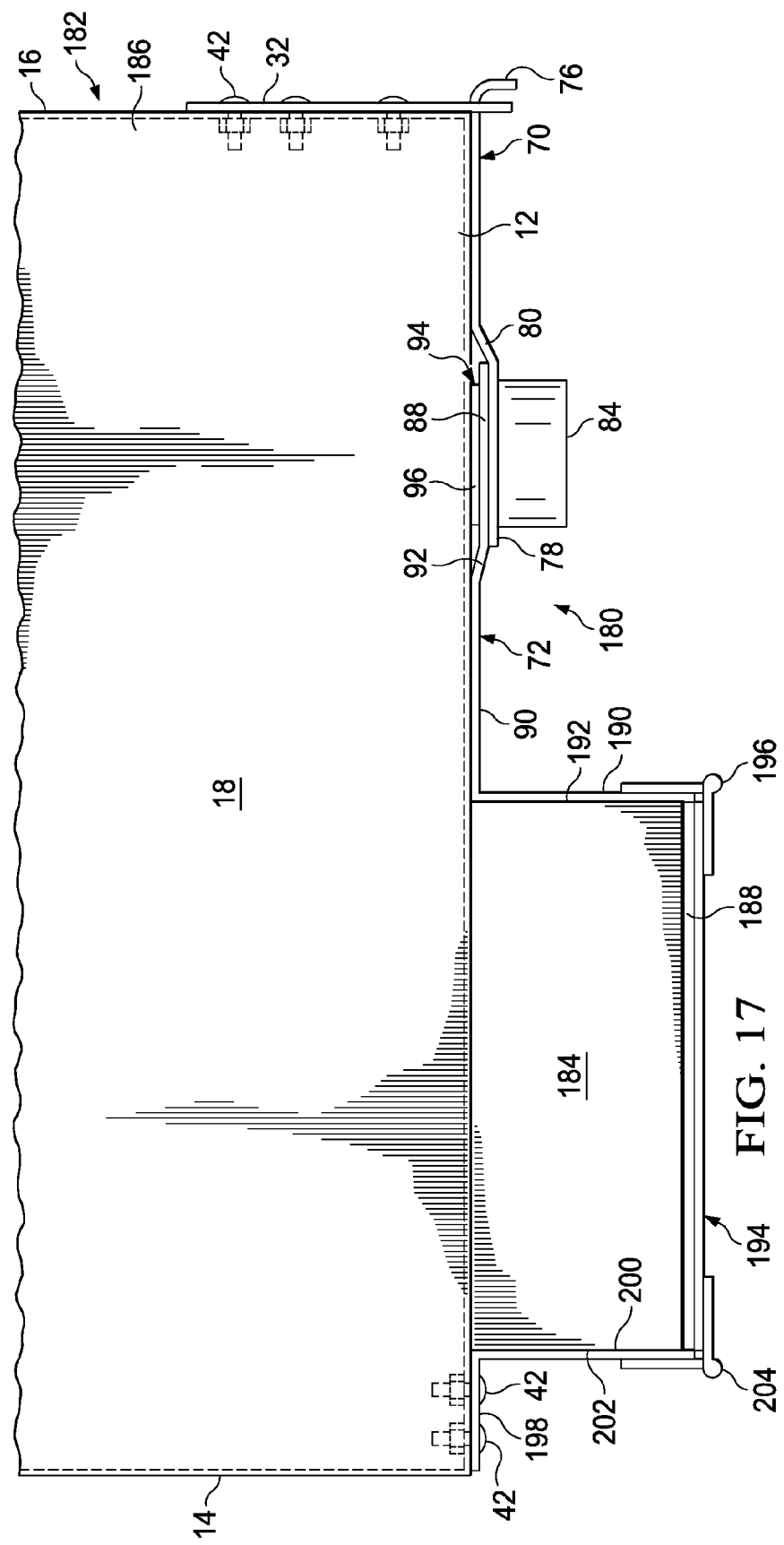
FIG. 17 is a top plan view of another embodiment of a locking system used in combination with an enclosure having a projecting sub-enclosure.

Referring to FIG. 17, another embodiment of a locking system 180 is shown for use with an enclosure 182. The enclosure 182 is similar to the enclosure 10 with similar components being labeled with the same reference numerals. The enclosure 182 has a projecting sub-enclosure structure 184 that projects forward from a portion of the front face panel 12 of a larger main enclosure 186. The sub-enclosure structure 184 is generally spaced apart from the sides of the face panel 12, as is shown. The face panel 12 of the main enclosure 186 may be a non-movable face panel or a movable face panel. The sub-enclosure structure 184 may include a movable front face panel 188 that forms a door of an opening of the structure 184 to access the interior of the structure 184. In some embodiments, the entire sub-enclosure structure 184 may be movable with respect to the main enclosure 186, with the sub-enclosure 184 itself forming a door or cover for an opening formed in the face panel 12 of the main enclosure 186. In such cases, the face panel 188 of the enclosure 184 may be movable or non-movable.

As shown, a strap member 72 having an outer end portion 90 is bent or angled so that it has an angled portion 190 that projects forward along the right sidewall 192 of the sub-enclosure 184. The strap member 72 with the angled portion 190 is sized and configured to accommodate the right sidewall 192 of the sub-enclosure 184 so that the angled portion 190 generally lies against and extends along the length of the sidewall 192.

The forward end of the angled portion 192 is coupled to an inner end of a sub-enclosure strap 194 through hinge 196. The sub-enclosure strap 194 is formed as an elongated plate or planar member, which may be similar to the straps 70, 72, previously described for enclosure 10. The strap 194 is sized and configured to extend across the width of front face panel 188 of the enclosure 184.

A mounting bracket 198 that may be configured similarly to bracket member 32 of enclosure 10 is provided on the left side of the face panel 12 and is coupled thereto with carrier bolts 42, as has been described. The bracket 198 is formed as an angled plate member having a forward projecting portion 200 that is sized and configured to accommodate the left sidewall 202 of the sub-enclosure 184 so that the portion 200 generally lies against and extends along the length of the sidewall 202. The bracket 198 may be positioned at other positions as well, such as the left sidewall 14 of the main enclosure 186. In such instances where the bracket 198 is differently positioned to the embodiment shown, cooperating structures, members, hinges, etc., may be provided to accommodate the size and shape of the main enclosure 186 and sub-enclosure 184.

A hinge 204 couples the forward portion 200 of bracket 198 to the outer end of the sub-enclosure strap 194, so that the straps 72, 194 are pivotal about the hinges 196, 204. Together the straps 72, 194 that are coupled together through the hinges 196, 204 constitute a single locking strap member as that term is used in detailed description and in the claims. Thus, in certain embodiments two or more straps or other members that are coupled together through hinges or other coupling structures may constitute a single locking strap member.

As shown, a mounting bracket 32 is provided on the left sidewall 16 of main enclosure 186 by means of carrier bolts 42, as has been previously described. The crooked or angled portion 76 of strap member 70 is received within and passes through the vertical slot 51 of the bracket 32.

A staple assembly 94 is provided on the face panel 12 of the main enclosure 186, as with the enclosure 10 previously described.

In use, the enclosure 182 with the sub-enclosure 184 is provided with the locking system 180. With the strap member 70 removed, the face panel 188 of the sub-enclosure 184 may be opened by pivoting the strap member 72 with angled portion 190 and the strap member 194 out of the way. This is accomplished by means of the hinges 196, 204. The door or face panel 188 may then be opened to allow access to the interior of the sub-enclosure 184. In other embodiments, this may also allow removal or opening of the entire sub-enclosure 184 from the face panel 12 of the main enclosure 186.

When the panel 188 is closed, the locking system 180 can be locked to a locked condition to prevent unauthorized access to the interior of the enclosure 182. To lock the locking system 180, the strap member 72 with angled portion 190 and the strap member 194 are rotated or pivoted about the hinges 196, 204, to a closed position wherein the strap member 194 extends across and overlies the width of the closed door panel 188 of the sub-enclosure 184 and the inner portion 88 of the strap member 72 receiving the staple member (not shown) of the staple assembly 94. The strap member 70 can then be secured as has been described previously and a padlock or other locking device can then used to lock the locking system 180 in a locked condition.

While the invention has been shown in only some of its forms, it should be apparent to those skilled in the art that it is not so limited, but is susceptible to various changes and modifications without departing from the scope of the invention. Accordingly, it is appropriate that the appended claims be construed broadly and in a manner consistent with the scope of the invention.

We claim:

1. A cabinet enclosure and locking system comprising:
a cabinet enclosure having an opening that allows access to the interior of the enclosure;
a cabinet enclosure door or access panel that is movable between an open and closed position to selectively open and close the opening of the enclosure;
a first side mounting bracket that is coupled to the enclosure to one side of the opening, the first side mounting bracket being either 1) non-releasably coupled to the enclosure or 2) releasably coupled to the enclosure with releasable fasteners that are at least one of inaccessible and non-engagable with a cooperating tool when the enclosure locking system is in a locked condition, the first side mounting bracket having a forward portion that projects from the enclosure where the first side mounting bracket is coupled, and wherein the forward portion of the first side mounting bracket has an elongated slot;
a removable first locking strap member being configured as a rigid, elongated plate or planar member having opposite outer and inner ends, the outer end being configured and sized to be received within and pass through the elongated slot, the outer end of the first locking strap member having an angled or crooked portion so that the first locking strap member must be rotated during passage of the outer end through the elongated slot during insertion into and removal from the elongated slot, and wherein the angled or crooked portion is configured and sized to prevent passage of the angled or crooked portion through the elongated slot when the first locking strap is rotated to a locked orientation wherein the length of the first locking strap member is movable longitudinally within the elongated slot; and further comprising
one of A or B, wherein:
A comprises:
a staple assembly that is either 1) non-releasably coupled to the door or access panel, or 2) releasably coupled to the door or access panel with releasable fasteners that are at least one of inaccessible and non-engagable with a cooperating tool when the enclosure locking system is in a locked condition, the staple assembly having a projecting staple member that projects forward from the door or access panel, the staple member having a shackle opening for receiving a shackle or lock pin of a padlock, and wherein the first strap member is provided with an aperture for receiving the staple member when in a locked condition, and wherein the first locking strap member prevents opening of the cabinet enclosure door or access panel to access the interior of the enclosure when in the locked condition; and B comprises:
a second side mounting bracket that is coupled to the enclosure on an opposite side of the opening from the first side mounting bracket;
a second locking strap member, the second locking strap member having opposite inner and outer ends, the outer end being coupled to the second side mounting bracket; and
a staple assembly formed from cooperating staple members that are provided on the inner end of the first locking strap member and the inner end of the second locking strap member, the staple members each having a staple opening that is aligned with the other for receiving a shackle or lock pin of a padlock when the first and second locking strap members are in a locked condition, and wherein the first and second locking strap members prevent opening of the cabinet enclosure door or access panel to access the interior of the enclosure when in the locked condition.

2. The cabinet enclosure and locking system of claim 1, further comprising:
a lock shroud is non-releasably coupled to the inner end of the first strap member, the lock shroud being configured to surround a padlock, or shackle or locking pin of a padlock when secured to the staple assembly to facilitate prevention of tampering therewith.

3. The cabinet enclosure and locking system of claim 1, wherein:
the first side mounting bracket is coupled to a sidewall that is non-parallel to the face of the enclosure.

4. The cabinet enclosure and locking system of claim 1, wherein:
the inner end of the first strap member overlies the door or access panel when the door or access panel is in the closed position.

5. The cabinet enclosure and locking system of claim 1, wherein:
the forward portion of the first side mounting bracket is provided with reinforcement areas surrounding the elongated slot that are of a different material that is more difficult to cut or damage than the material of the first side mounting bracket.

6. The cabinet enclosure and locking system of claim 1, wherein:
the first locking strap member has a width of from 2 to 5 inches and a thickness of greater than 1/8 inch.

7. The cabinet enclosure and locking system of claim 1, wherein:
A further comprises:
a second side mounting bracket that is coupled to one side of the opening opposite from the first side mounting bracket; and
a second locking strap member being configured as a rigid, elongated plate or planar member having opposite outer and inner ends, and wherein the second locking strap member is coupled at the outer end to the second side mounting bracket; and wherein
the inner end of each of the first and second locking strap members extends from the outer end when in the locked condition to a position wherein the inner end of each locking strap member overlaps the other a distance when in the locked condition, at least a portion of at least one of the first and second locking strap members overlying the door or access panel when the door or access panel is in the closed position when in the locked condition.

8. The cabinet enclosure and locking system of claim 7, wherein:
at least one of the first locking strap member and the second locking strap member of A and B is formed from two members that are pivotally coupled together.

9. The cabinet enclosure and locking system of claim 1, wherein:
the cabinet enclosure and locking system comprises A.

10. A cabinet enclosure and locking system comprising:
a cabinet enclosure having an opening that allows access to the interior of the enclosure;
a cabinet enclosure door or access panel that is movable between an open and closed position to selectively open and close the opening of the enclosure;
a first side mounting bracket that is coupled to the enclosure to one side of the opening, the first side mounting bracket being either 1) non-releasably coupled to the enclosure or 2) releasably coupled to the enclosure with releasable fasteners that are at least one of inaccessible and non-engagable with a cooperating tool when the enclosure locking system is in a locked condition, the first side mounting bracket having a forward portion that projects from the enclosure where the first side mounting bracket is coupled, and wherein the forward portion of the first side mounting bracket has an elongated slot;
a removable first locking strap member being configured as a rigid, elongated plate or planar member having opposite outer and inner ends, the outer end being configured and sized to be received within and pass through the elongated slot, the outer end of the first locking strap member having an angled or crooked portion so that the first locking strap member must be rotated during passage of the outer end through the elongated slot during insertion into or removal from the elongated slot, and wherein the angled or crooked portion is configured and sized to prevent passage of the angled or crooked portion through the elongated slot when the first locking strap member is rotated to a locked orientation wherein the length of the first locking strap member is movable longitudinally within the elongated slot; and further comprising
one of A or B, wherein:
A comprises:
a staple assembly that is either 1) non-releasably coupled to the door or access panel, or 2) releasably coupled to the door or access panel with releasable fasteners that are at least one of inaccessible and non-engagable with a cooperating tool when the enclosure locking system is in a locked condition, the staple assembly having a projecting staple member that projects forward from the door or access panel, the staple member having a shackle opening for receiving a shackle or lock pin of a padlock, and wherein the first strap member is provided with an aperture for receiving the staple member when in a locked condition, and wherein the first locking strap member prevents opening of the cabinet enclosure door or access panel to access the interior of the enclosure when in the locked condition; and B comprises:
a second side mounting bracket that is coupled to the enclosure on an opposite side of the opening from the first side mounting bracket;
a second locking strap member, the second locking strap member having opposite inner and outer ends, the outer end being coupled to the second side mounting bracket; and
a staple assembly formed from cooperating staple members that are provided on the inner end of the first locking strap member and the inner end of the second locking strap member, the staple members each having a staple opening that is aligned with the other for receiving a shackle or lock pin of a padlock when the first and second locking strap members are in a locked condition, and wherein the first and second locking strap members prevent opening of the cabinet enclosure door or access panel to access the interior of the enclosure when in the locked condition; and a lock shroud non-releasably coupled to the inner end of the first strap member, the lock shroud being configured to surround a padlock, or shackle or locking pin of a padlock when secured to the staple assembly of said one of A or B to facilitate prevention of tampering therewith.

11. The enclosure and locking system of claim 10, wherein:
the first side mounting bracket is coupled to a sidewall that is non-parallel to the face of the enclosure.

12. The enclosure and locking system of claim 10, wherein:
the inner end of the first strap member overlies the door or access panel when the door or access panel is in the closed position.

13. The enclosure and locking system of claim 10, wherein:
the forward portion of the first side mounting bracket is provided with reinforcement areas surrounding the elongated slot that are of a different material that is more difficult to cut or damage than the material of the first side mounting bracket.

14. The enclosure and locking system of claim 10, wherein:
the first locking strap member has a width of from 2 to 5 inches and a thickness of greater than 1/8 inch.

15. The enclosure and locking system of claim 10, wherein:
A further comprises:
a second side mounting bracket that is coupled to one side of the opening opposite from the first side mounting bracket; and
a second elongated plate or planar locking strap member having opposite outer and inner ends, and wherein the second locking strap member is coupled at the outer end to the second side mounting bracket; and wherein the inner end of each of the first and second locking strap members extends from the outer end when in the locked condition to a position wherein the inner end of each locking strap member overlaps the other a distance when in the locked condition, at least a portion of at least one of the first and second locking strap members overlying the door or access panel when the door or access panel is in the closed position when in the locked condition.

16. The enclosure and locking system of claim 15, wherein:
the enclosure has a projecting power plug; and
at least one of the first and second side mounting brackets includes a power plug guard or shroud having a central opening for receiving and accommodating the projecting power plug of the enclosure.

17. The enclosure and locking system of claim 15, wherein:
at least one of the first locking strap member and the second locking strap member of A and B is formed from two members that are pivotally coupled together.

18. The enclosure and locking system of claim 15, wherein:
the cabinet enclosure and locking system comprises A.

19. The enclosure and locking system of claim 15, wherein:
the enclosure comprises a main enclosure and a projecting sub-enclosure that projects from a portion of the main enclosure; and wherein at least one of the first and second locking strap members is formed from two members that are pivotally coupled together, at least one of the two members of said at least one of the first and second locking strap members overlying the sub-enclosure.

20. A cabinet enclosure and locking system comprising:
a cabinet enclosure having an opening that allows access to the interior of the enclosure;
a cabinet enclosure door or access panel that is movable between an open and closed position to selectively open and close the opening of the enclosure;
first and second side mounting brackets that are each coupled to opposite portions of the enclosure located on opposite sides of the opening, the first and second mounting brackets being either 1) non-releasably coupled to the opposite portions of the enclosure or 2) releasably coupled to the opposite portions of the enclosure with releasable fasteners that are at least one of inaccessible and non-engagable with a cooperating tool when the enclosure locking system is in a locked condition, at least one side mounting bracket having a forward portion that projects from the enclosure where said at least one side mounting bracket is coupled, and wherein the forward portion of said at least one side mounting bracket has an elongated slot;
first and second rigid elongated plate or planar locking strap members each having opposite outer and inner ends, the outer end of at least one of the locking strap members being configured and sized to be received within and pass through the elongated slot, the outer end of said at least one of the locking strap members being removable and having an angled or crooked portion so that said at least one of the locking strap members must be rotated during passage of the outer end through the elongated slot during insertion into and removal from the elongated slot, and wherein the angled or crooked portion is configured and sized to prevent passage of the angled or crooked portion through the elongated slot when said at least one locking strap member is rotated to a locked orientation wherein the length of said at least one locking strap member is movable longitudinally within the elongated slot, and wherein the inner end of each locking strap member extends from the outer end when in the locked condition to a position wherein the inner end of each locking strap member overlaps the other a distance when in the locked condition, at least a portion of at least one of the first and second locking strap members overlying the door or access panel when the door or access panel is in the closed position when in the locked condition, and wherein the first and second locking strap members prevent opening of the cabinet enclosure door or access panel to access the interior of the enclosure when in the locked condition;

a staple assembly that is one of A or B, wherein:

A is the staple assembly is either 1) non-releasably coupled to the door or access panel or 2) releasably coupled to the door or access panel with releasable fasteners that are at least one of inaccessible and non-engagable with a cooperating tool when the enclosure locking system is in a locked condition, the staple assembly having a projecting staple member that projects forward from the door or access panel, the staple member having a shackle opening for receiving a shackle or lock pin of a padlock, and wherein the locking strap members are provided with apertures for receiving the staple member when in the locked condition; and B is the staple assembly is formed from cooperating staple members that are provided on the inner ends of the first and second locking strap members, the staple members each having a staple opening that is aligned with the other for receiving a shackle or lock pin of a padlock when in the locked condition.

* * * * *